United States Patent
Nishioka et al.

(10) Patent No.: US 11,338,846 B2
(45) Date of Patent: May 24, 2022

(54) DETECTION SIGNAL CORRECTION METHOD, MOTOR CONTROL DEVICE, AND ELECTRIC POWER STEERING DEVICE

(71) Applicant: NSK LTD., Tokyo (JP)

(72) Inventors: Yusuke Nishioka, Maebashi (JP); Yoshihiro Aosaki, Fujisawa (JP); Hiroyuki Yamamura, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/299,884

(22) PCT Filed: Dec. 21, 2020

(86) PCT No.: PCT/JP2020/047702
§ 371 (c)(1),
(2) Date: Jun. 4, 2021

(87) PCT Pub. No.: WO2021/250917
PCT Pub. Date: Dec. 16, 2021

(65) Prior Publication Data
US 2022/0009548 A1   Jan. 13, 2022

(30) Foreign Application Priority Data

Jun. 8, 2020 (JP) .............................. JP2020-099632

(51) Int. Cl.
*B62D 5/00* (2006.01)
*B62D 5/04* (2006.01)

(52) U.S. Cl.
CPC ......... *B62D 5/0463* (2013.01); *B62D 5/0409* (2013.01); *B62D 5/049* (2013.01)

(58) Field of Classification Search
CPC .... B62D 5/0463; B62D 5/0409; B62D 5/049; B62D 5/00; B62D 6/00

USPC ........................................................ 701/42
See application file for complete search history.

(56) References Cited

U.S. PATENT DOCUMENTS

| 2006/0273247 A1* | 12/2006 | Sakamaki | ............... B62D 5/049 250/231.13 |
| 2009/0240389 A1* | 9/2009 | Nomura | .................... H02P 6/16 701/31.4 |
| 2018/0319440 A1* | 11/2018 | Ernstson | ............ B62D 15/0235 |

FOREIGN PATENT DOCUMENTS

| JP | 2005-147733 A | 6/2005 |
| JP | 2006-335252 A | 12/2006 |
| JP | 2008-087756 A | 4/2008 |
| JP | 2019-144056 A | 8/2019 |

OTHER PUBLICATIONS

Written opinion for PCT/JP2020/047702 dated Feb. 9, 2021.
International search report for PCT/JP2020/047702 dated Feb. 9, 2021.

* cited by examiner

*Primary Examiner* — Shardul D Patel
(74) *Attorney, Agent, or Firm* — Sughrue Mion, PLLC

(57) ABSTRACT

A detection signal correction method includes: calculating a rotation angle of a rotation shaft of a motor, based on a detection signal of a sensor; calculating a steering velocity of a steering shaft based on the rotation angle; calculating an error of the detection signal; and correcting the error of the detection signals when the steering velocity is equal to or greater than a steering velocity threshold value and the error of the detection signal is equal to or greater than an error threshold value.

9 Claims, 10 Drawing Sheets

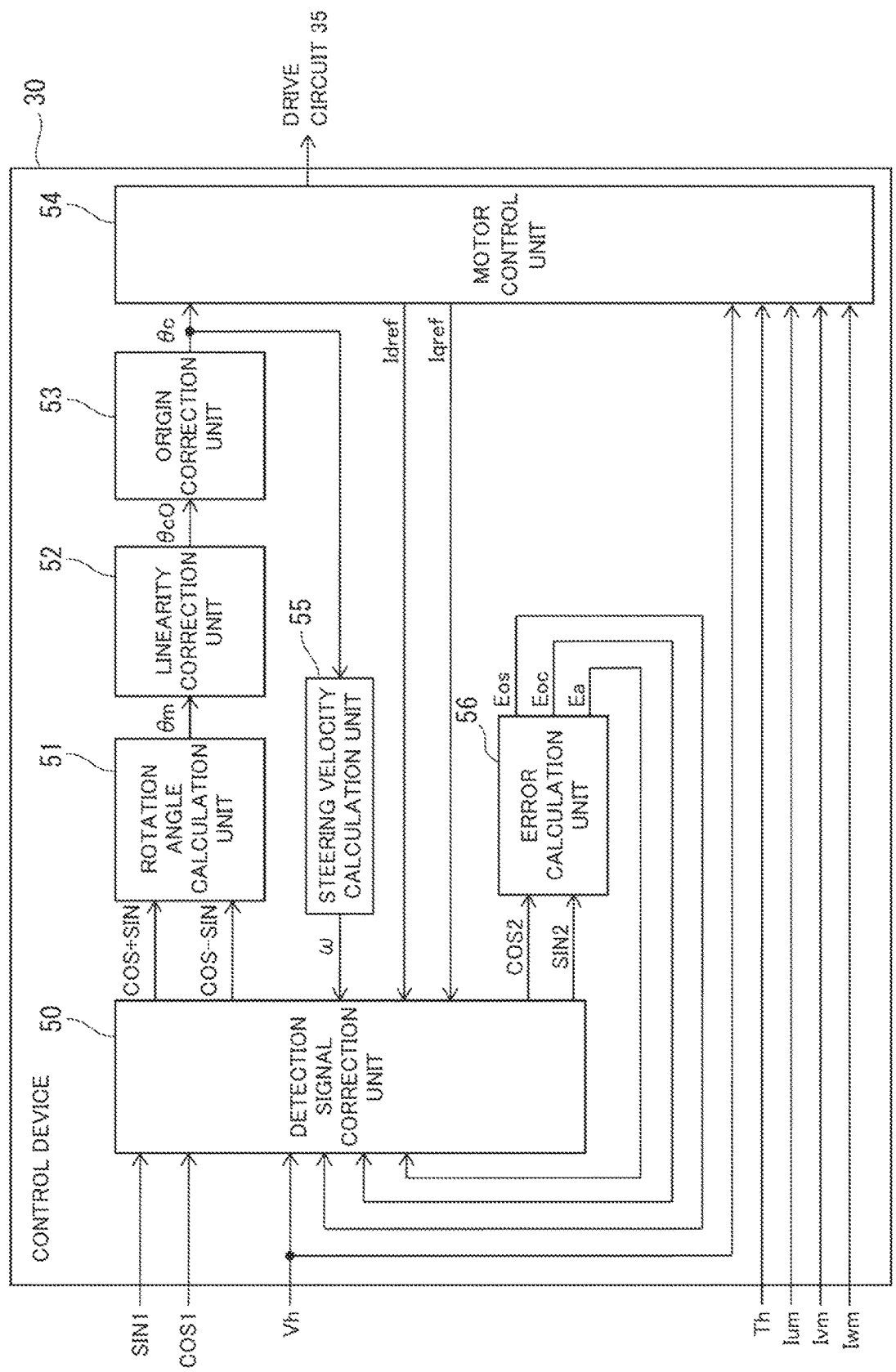

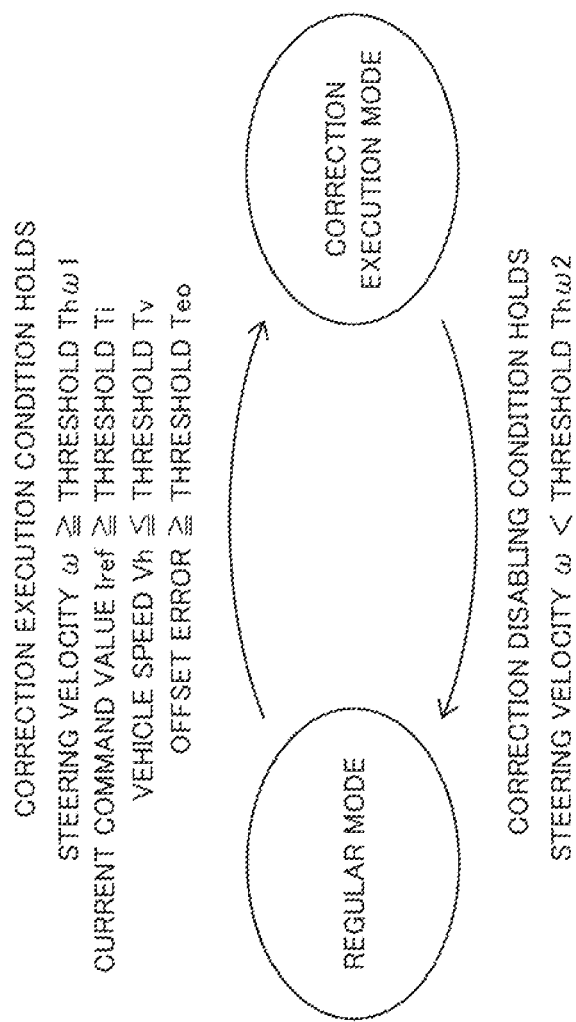

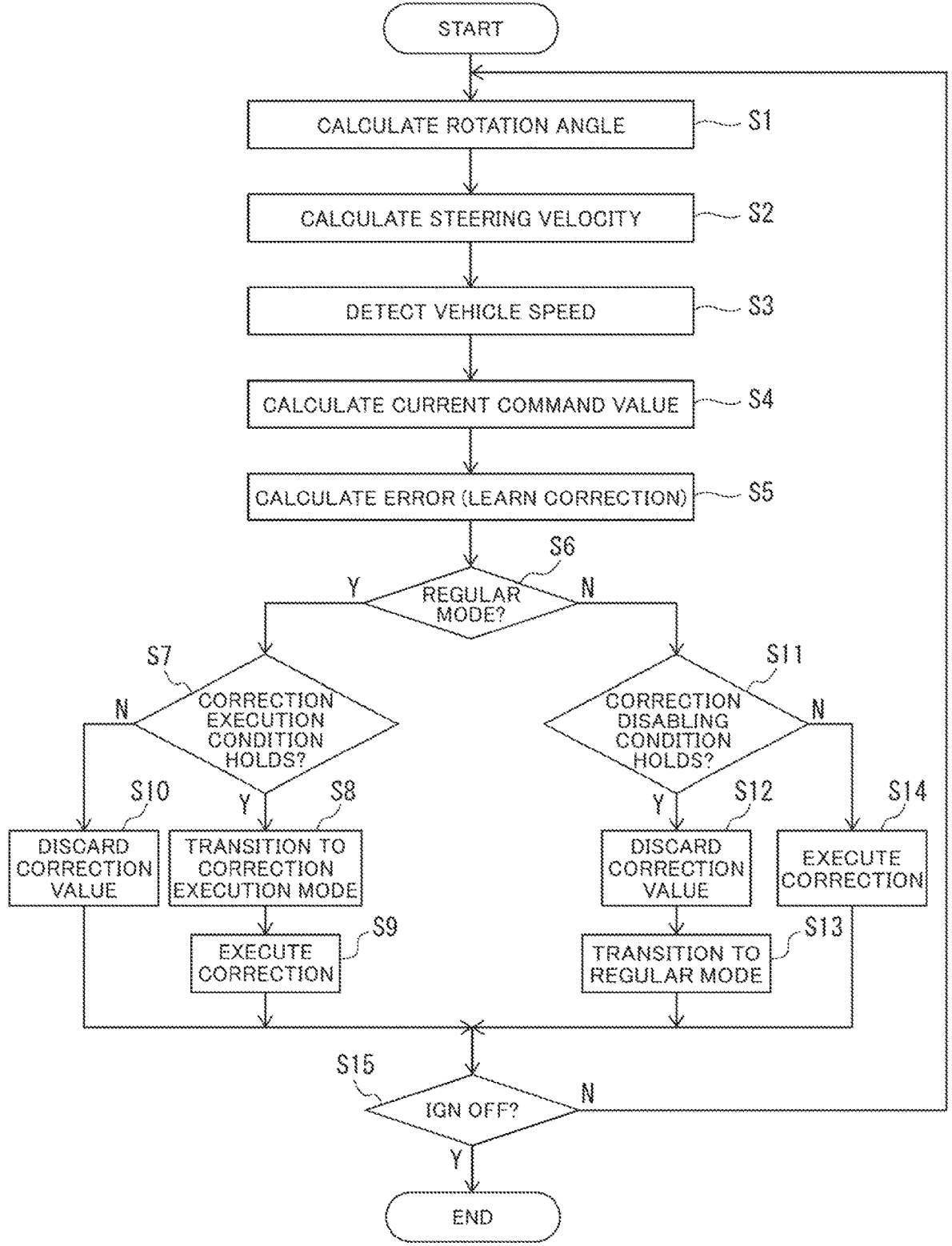

DETECTION SIGNAL CORRECTION METHOD, MOTOR CONTROL DEVICE, AND ELECTRIC POWER STEERING DEVICE

CROSS-REFERENCE TO RELATED APPLICATIONS

This application is a National Stage of International Application No. PCT/JP2020/047702 filed Dec. 21, 2020, which claims priority under U.S.C. § 119(a) to Japanese Patent Application No. JP2020-099632 filed on Jun. 8, 2020.

TECHNICAL FIELD

The present invention relates to a detection signal correction method, a motor control device, and an electric power steering device.

BACKGROUND ART

Electric power steering (EPS) devices that assist steering, using a motor in order to reduce steering force of a vehicle have been known. For example, in PTL 1 described below, a motor control device that calculates a rotation angle of a motor, based on a sine signal and a cosine signal output from a sensor depending on rotation of the rotation shaft of the motor for electric power steering device and controls the motor, based on the calculated rotation angle is disclosed.

CITATION LIST

Patent Literature

PTL 1: JP 2019-144056 A

SUMMARY OF INVENTION

Technical Problem

When a rotation angle of a motor is calculated using a sensor that outputs a detection signal depending on the rotation of the rotation shaft of the motor, error sometimes occurs on a detection signal from the sensor depending on an actual usage environment (temperature or the like) even when calibration is performed upon shipment of the sensor.

When a rotation angle of the motor is calculated using such a detection signal containing error, linearity of detected values (measured angles) of the rotation angle deteriorates.

When the motor is controlled based on the measured angle containing linearity error, vibration having a frequency component that is included in the linearity error and the period of which is an integer multiple of a motor rotation period occurs on the motor. When the frequency of the vibration coincides with a resonant frequency of the vehicle body, the vehicle vibrates and the vibration is transmitted to the driver as abnormal noise or vibration, as a result of which there is a possibility that comfortableness is impaired.

The present invention has been made in consideration of the above-described problem, and an object of the present invention is to, when a motor providing a steering shaft of a vehicle with steering assist torque is controlled based on a detection signal output from a sensor depending on rotation of a rotation shaft of the motor, reduce resonance of the vehicle occurring due to vibration generated by the motor.

Solution to Problem

In order to achieve the above-described object, according to an aspect of the present invention, there is provided a detection signal correction method for correcting a sine signal and a cosine signal, the sine signal and the cosine signal being detection signals output from a sensor depending on rotation of a rotation shaft of a motor providing a steering shaft of a vehicle with steering assist torque, the method including: calculating a rotation angle of the rotation shaft, based on the detection signals; calculating a steering velocity of the steering shaft, based on the rotation angle; calculating an error of the detection signals; and correcting the error of the detection signals when the steering velocity is equal to or greater than a steering velocity threshold value and the error of the detection signals is equal to or greater than an error threshold value.

According to another aspect of the present invention, there is provided a motor control device for a motor providing a steering shaft of a vehicle with steering assist torque, including: a sensor configured to output detection signals including a sine signal and a cosine signal depending on rotation of a rotation shaft of the motor; a rotation angle calculation unit configured to calculate a rotation angle of the rotation shaft, based on the detection signals; a control unit configured to control the motor, based on the rotation angle; a steering velocity calculation unit configured to calculate a steering velocity of the steering shaft, based on the rotation angle; an error calculation unit configured to calculate an error of the detection signals; and a detection signal correction unit configured to correct the error of the detection signals when the steering velocity is equal to or greater than a steering velocity threshold value and the error of the detection signals is equal to or greater than an error threshold value.

According to still another aspect of the present invention, there is provided an electric power steering device including: the motor control device described above; and a motor controlled by the motor control device, wherein the electric power steering device provides a steering shaft of a vehicle with steering assist force, using the motor.

Advantageous Effects of Invention

According to the present invention, it is possible to, when a motor providing a steering shaft of a vehicle with steering assist torque is controlled based on a detection signal output from a sensor depending on rotation of a rotation shaft of the motor, reduce resonance of the vehicle occurring due to vibration generated by the motor.

BRIEF DESCRIPTION OF DRAWINGS

FIG. 4 is an explanatory diagram of an example of a functional configuration of the control device;

FIG. 10 is a state transition diagram of an example of operation modes of the detection signal correction unit; and FIG. 11 is a flowchart of an example of a detection signal correction method of the embodiment.

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

(Configuration)

Figure 1:
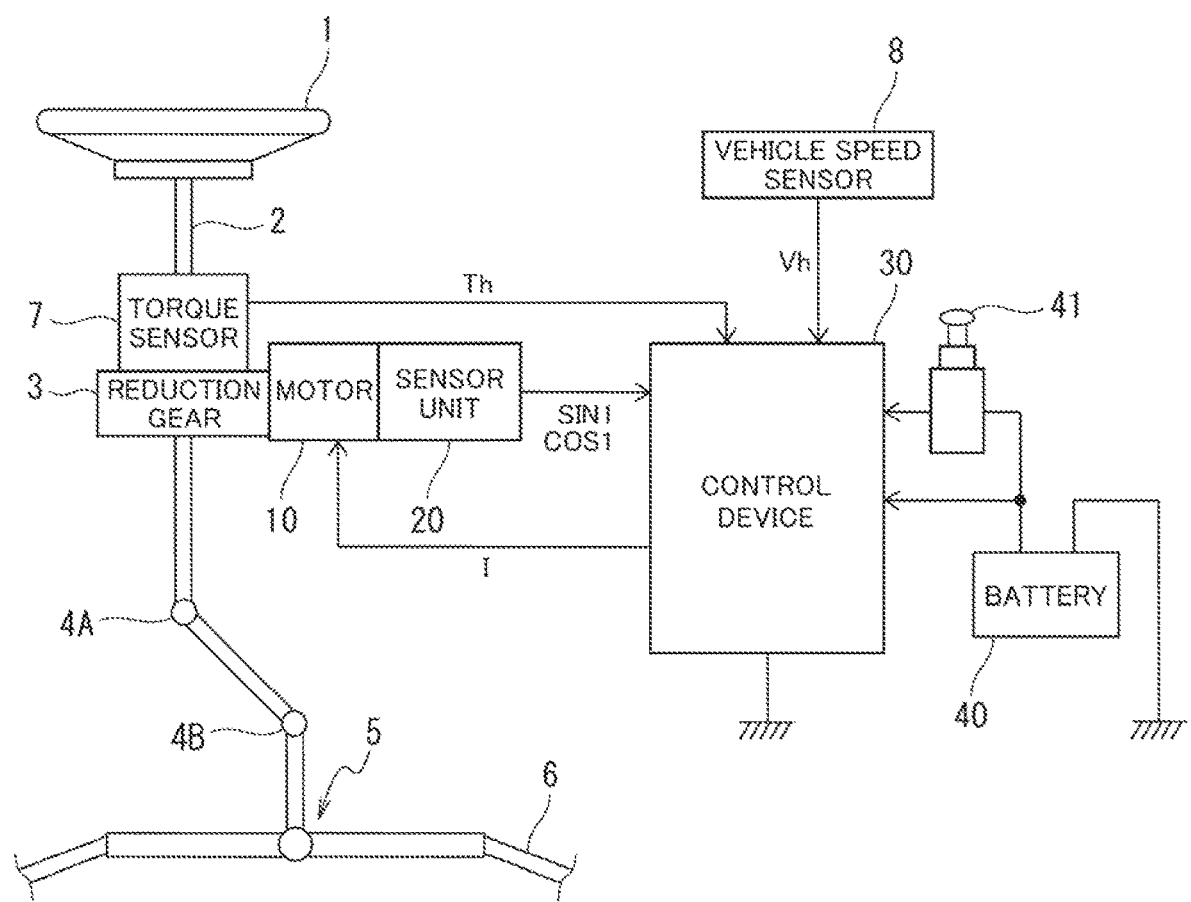
FIG. 1 is a configuration diagram illustrative of an overview of an example of an electric power steering device of an embodiment.

A configuration example of an electric power steering device of the present embodiment is illustrated in FIG. 1. A steering shaft (for example, a column shaft) 2 of a steering wheel 1 is connected to tie rods 6 of steered wheels via a reduction gear 3, universal joints 4A and 4B, and a pinion rack mechanism 5. To the steering shaft 2, a torque sensor 7 that detects steering torque Th applied to the steering shaft 2 is disposed, and a motor 10 that assists steering force of the steering wheel 1 is connected to the steering shaft 2 via the reduction gear 3.

A sensor unit 20 outputs a sine signal SIN 1=A×sin θ+B and a cosine signal COS 1=A×cos θ+B depending on a rotation angle θ of a rotor of the motor 10 to a control device 30. Hereinafter, the sine signal SIN 1 and the cosine signal COS 1 are sometimes collectively referred to as "detection signals".

The control device 30 is an electronic control unit (ECU) configured to control an electric power steering (EPS) device.

The sensor unit 20 and the control device 30 are an example of a "motor control device" described in the claims.

To the control device 30, power is supplied from a battery 40 and an ignition key signal is also input via an ignition (IGN) key 41. Note that a means for providing steering assist force is not limited to a motor and a variety of types of actuators can be used.

The control device 30 calculates a rotation angle θ of a rotation shaft 11 of the motor 10, based on detection signals detected by the sensor unit 20.

The control device 30 performs calculation of a steering assist command value of an assist command, using an assist map or the like, based on steering torque Th detected by the torque sensor 7 and vehicle speed Vh detected by a vehicle speed sensor 8.

The control device 30 drive-controls the motor 10 by controlling current I that is supplied to the motor 10, based on the steering assist command value and the rotation angle of the motor 10. This control causes torque generated by the motor 10 to be provided to a steering system as assist force (steering assist force) for steering operation performed by the driver.

Figure 2:
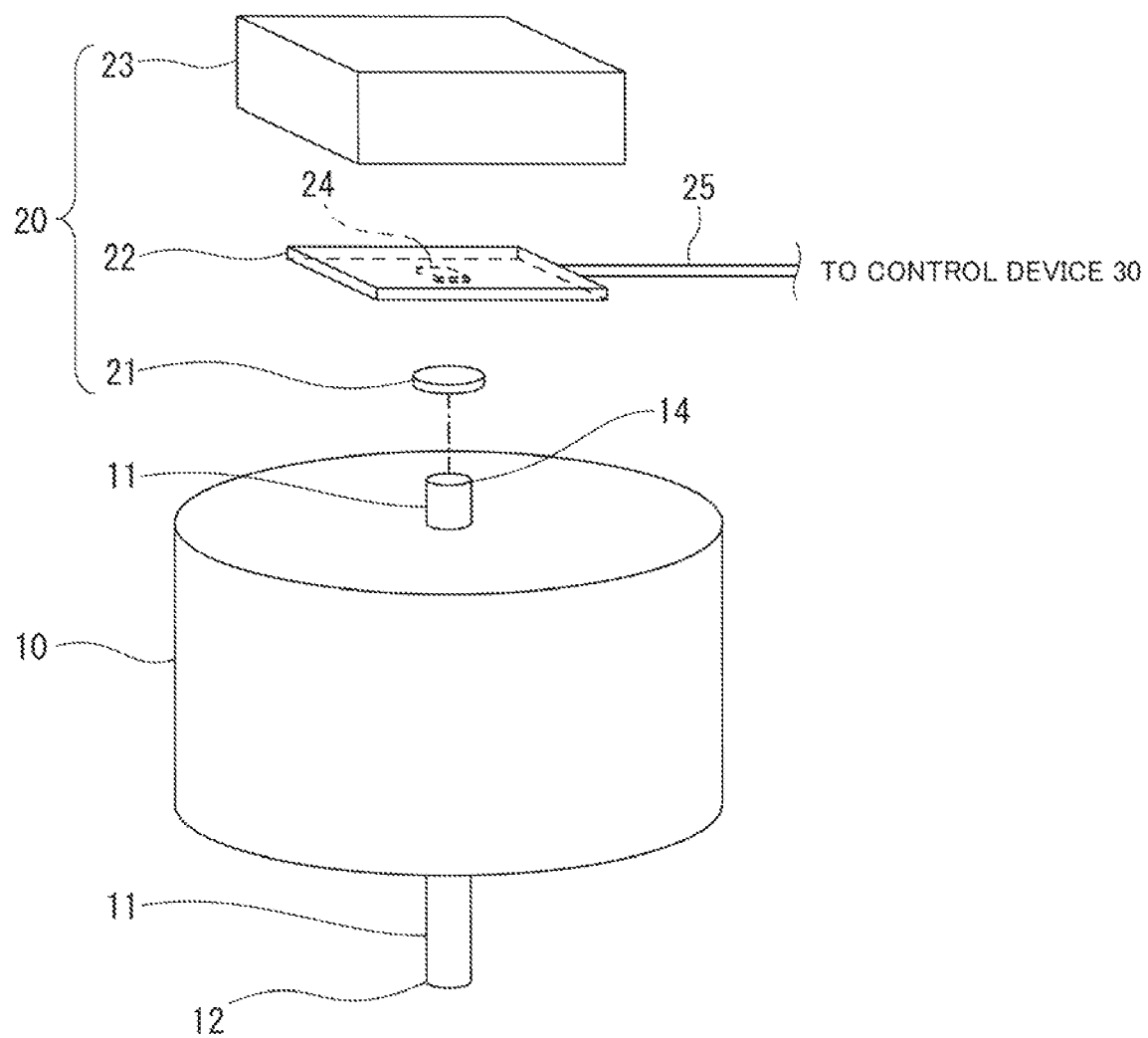
FIG. 2 is an exploded view illustrative of an overview of an example of a sensor unit.

With reference to FIG. 2, the sensor unit 20 will be described.

The sensor unit 20 includes a magnet 21, a circuit board 22, and a support member 23.

The magnet 21 is fixed to an end 14 of the rotation shaft 11 of the motor 10 on the opposite side to an output end 12 thereof and has different magnetic poles (S-poles and N-poles) arranged along the circumferential direction of the rotation shaft 11.

On the circuit board 22, a magnetic resistance (MR) sensor element (integrated circuit) 24 is mounted. A redundant system, with a plurality of MR sensor elements mounted on the circuit board 22, configured to separately calculate a rotation angle of the rotation shaft 11, based on detection signals from each of the MR sensor elements may be configured.

The circuit board 22 is fixed to the support member 23 by means of a not-illustrated fixing means, such as a fastening screw and caulking. In addition, the support member 23 is similarly fixed to the motor 10 by means of a not-illustrated fixing means.

A position at which the circuit board 22 is fixed to the support member 23 and a position at which the support member 23 is fixed to the motor 10 are determined in such away that, when the circuit board 22 is fixed to the support member 23 and the support member 23 is fixed to the motor 10, the circuit board 22 is arranged between the support member 23 and the motor 10 and the MR sensor element 24 comes close to the magnet 21.

When the rotation shaft 11 rotates in conjunction with the rotor of the motor 10 and the magnet 21 rotates in association with the rotation of the rotation shaft 11, this rotation causes the MR sensor element 24 to detect a change in magnetic flux of the magnet 21 depending on a rotation angle and to output detection signals depending on the rotation of the rotation shaft 11 of the motor 10.

For example, the MR sensor element 24 outputs a sine signal SIN 1 and a cosine signal COS 1 depending on the rotation angle θ of the rotation shaft 11 of the motor 10 as detection signals depending on the rotation of the rotation shaft 11 of the motor 10.

Note that the sensor unit 20 may include a sensor other than an MR sensor. As the sensor unit 20, a variety of types of sensors that output a sine signal and a cosine signal depending on the rotation angle θ of the rotation shaft 11 can be employed.

The support member 23 is, for example, a cover that covers the circuit board 22. The support member 23, for example, has a recessed portion that opens downward in FIG. 2, and the circuit board 22 is fixed inside the recessed portion of the support member 23. When the support member 23 is fixed to the motor 10, an opening portion of the recessed portion of the support member 23 is shielded by the motor 10 and the circuit board 22 is housed inside an internal space that is defined by the recessed portion of the support member 23 and the motor 10. This configuration causes the circuit board 22 to be protected from impact or foreign objects from the outside.

The support member 23 may be formed of a metal having excellent thermal conductivity, such as an aluminum alloy, and may act as a heat sink. The support member 23 may be a heat sink itself.

The control device 30, which is an electronic control unit that is a separate entity from the sensor unit 20, is connected to the sensor unit 20 by means of a harness 25. Detection signals output from the MR sensor element 24 depending on the rotation of the rotation shaft 11 of the motor 10 are transmitted to the control device 30 via the harness 25.

The control device 30 calculates a rotation angle θ of the rotation shaft 11 of the motor 10, based on the detection signals detected by the MR sensor element 24 and controls a power semiconductor switching element depending on the calculated rotation angle θ to drive the motor 10.

Figure 3:
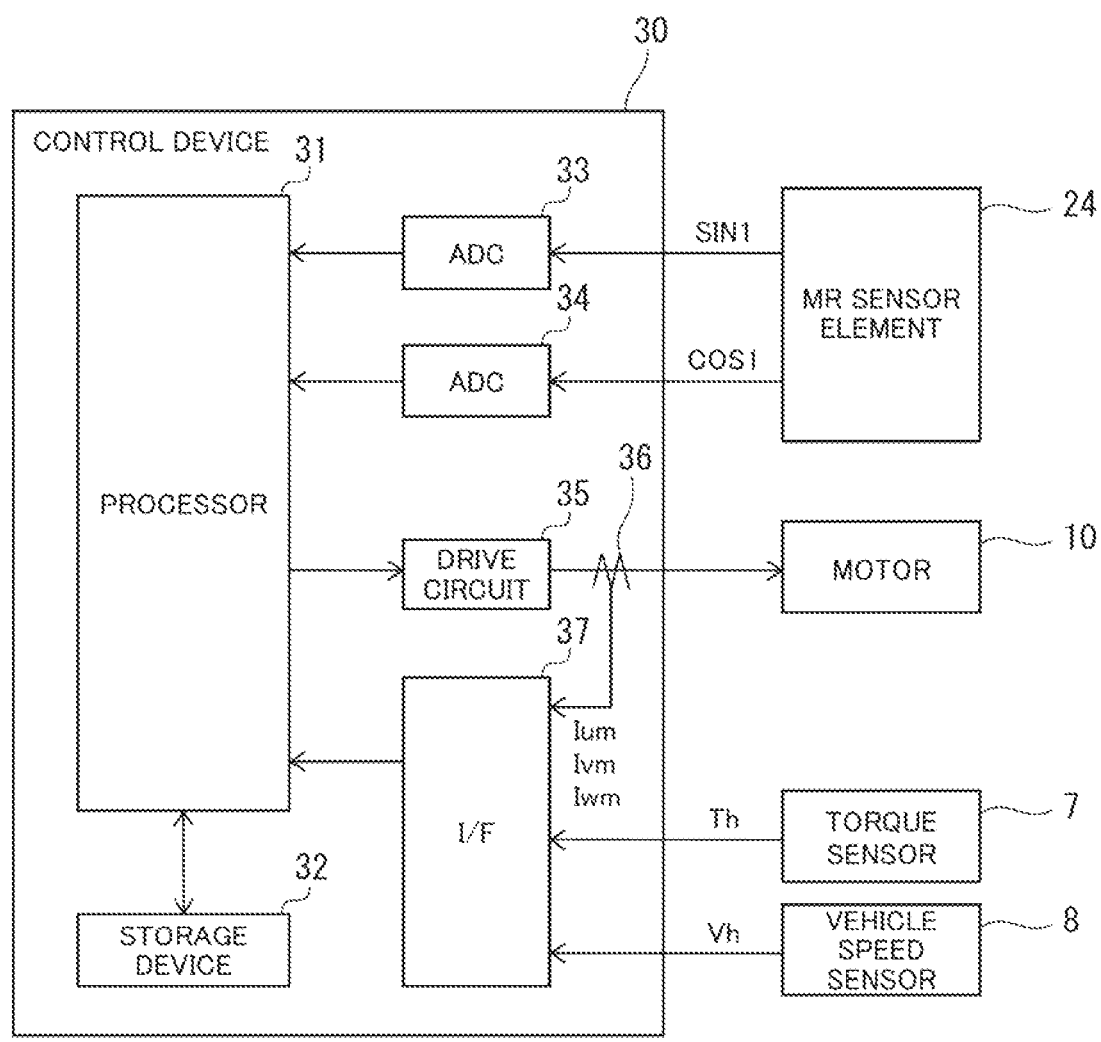
FIG. 3 is a configuration diagram illustrative of an overview of an example of a control device.

With reference to FIG. 3, the control device 30 will be described.

The control device 30 includes a processor 31, such as a central processing unit (CPU) or a micro-processing unit (MPU), a storage device 32 that is a memory or the like, an analog-digital converters (ADCs) 33 and 34, a drive circuit 35, a current sensor 36, and an interface (I/F) circuit 37.

Functions of the control device 30 that will be described below are achieved by, for example, the processor 31 executing computer programs stored in the storage device 32.

The control device 30 may be formed using dedicated hardware for performing respective parts of information processing, which will be described below, in addition to or in place of the processor 31.

For example, the control device 30 may include functional logic circuits that are set in a general-purpose semiconductor integrated circuit. For example, the control device 30 may have a programmable logic device (PLD), such as a field programmable gate array (FPGA), or the like.

The steering torque Th detected by the torque sensor 7 and the vehicle speed Vh detected by the vehicle speed sensor 8 are input to the processor 31 via the I/F circuit 37. The processor 31 calculates a steering assist command value of an assist command, based on the steering torque Th and the vehicle speed Vh.

The detection signals (that is, the sine signal SIN 1 and the cosine signal COS 1) output from the MR sensor element 24 are converted to digital signals by the ADC 33 and the ADC 34, and the digital signals are input to the processor 31. The processor 31 calculates a measured value of the rotation angle θ (hereinafter, referred to as "measured angle θm") of the rotation shaft 11 of the motor 10, based on the sine signal SIN 1 and the cosine signal COS 1. Further, the control device 30 calculates a corrected rotation angle θc by correcting linearity error and a phase shift of the origin of the measured angle θm.

The drive circuit 35 supplies motor current that drives the motor 10, based on a control signal output from the processor 31. The drive circuit 35 may, for example, be an inverter including a switching element that turns on and off the motor current.

The current sensor 36 detects the motor current. In the present embodiment, the motor 10 is a three-phase motor, and the current sensor 36 detects U-phase motor current Ium, V-phase motor current Ivm, and W-phase motor current Iwm. Note that the application target of the present invention is not limited to a three-phase motor. The present invention is applicable to motors having various numbers of phases.

The processor 31 reads detected values of the U-phase motor current Ium, the V-phase motor current Ivm, and the W-phase motor current Iwm via the I/F circuit 37.

The processor 31 generates a control signal for controlling the drive circuit 35, based on a steering assist command value calculated from the steering torque Th and the vehicle speed Vh, the corrected rotation angle θc, and the motor currents Ium, Ivm, and Iwm.

With reference to FIG. 4, an example of a functional configuration of the control device 30 will be described. The control device 30 includes a detection signal correction unit 50, a rotation angle calculation unit 51, a linearity correction unit 52, an origin correction unit 53, a motor control unit 54, a steering velocity calculation unit 55, and an error calculation unit 56.

Figure 5A:
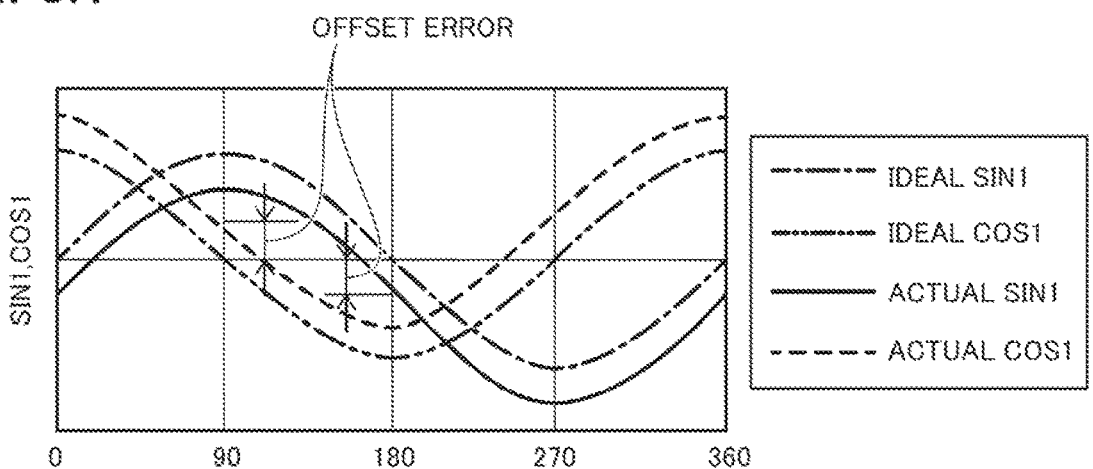
FIGS. 5A to 5C are explanatory diagrams of offset errors, amplitude error, and phase error, respectively, of a sine signal and a cosine signal.
Figure 5B:
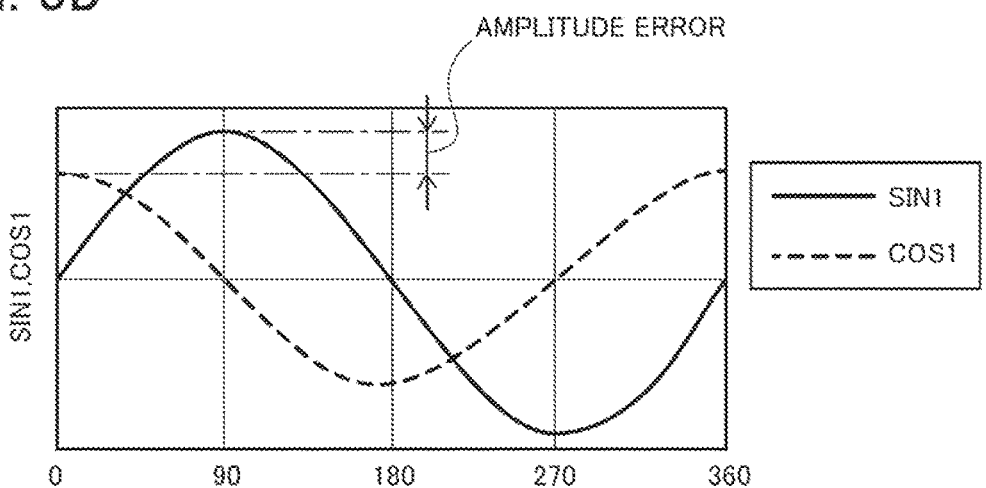

The detection signal correction unit 50 corrects the sine signal SIN 1 and the cosine signal COS 1. Specifically, the detection signal correction unit 50 corrects offset errors of the sine signal SIN 1 and the cosine signal COS 1 (see FIG. 5A) and amplitude error that is a difference in amplitude between the sine signal SIN 1 and the cosine signal COS 1 (see FIG. 5B).

In addition, the detection signal correction unit 50 calculates a sum signal (COS+SIN) and a difference signal (COS−SIN) between a sine signal and a cosine signal the offset errors and the amplitude error of which have been corrected.

Figure 5C:
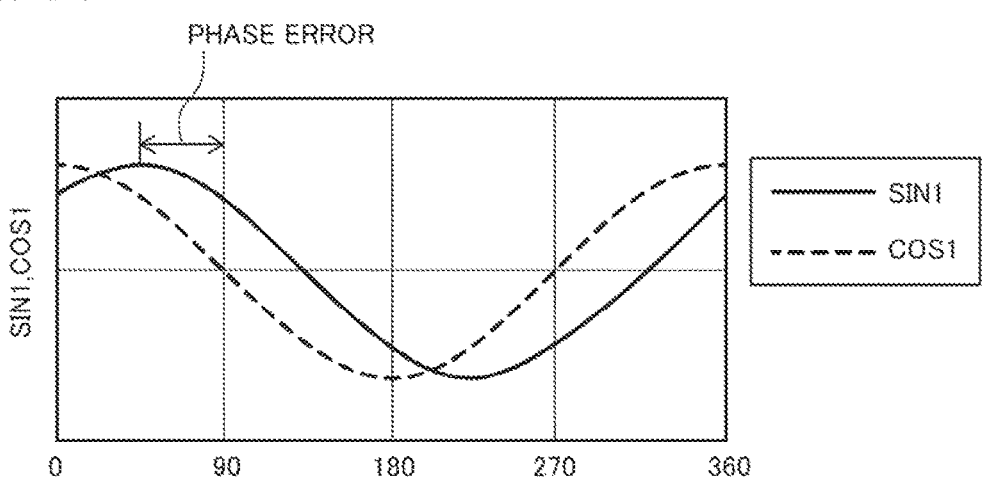

The detection signal correction unit 50 removes influence of phase error between the sine signal SIN 1 and the cosine signal COS 1 (see FIG. 5C) from the sum signal (COS+SIN) and the difference signal (COS−SIN) by correcting a difference between the amplitude of the sum signal (COS+SIN) and the amplitude of the difference signal (COS−SIN). A configuration and functions of the detection signal correction unit 50 will be further described later.

FIG. 4 is now referred to. The detection signal correction unit 50 outputs the sum signal (COS+SIN) and the difference signal (COS−SIN) to the rotation angle calculation unit 51.

The rotation angle calculation unit 51 calculates a measured angle θm of the rotation shaft 11 of the motor 10, based on the sum signal (COS+SIN) and the difference signal (COS−SIN).

The linearity correction unit 52 corrects linearity error of the measured angle θm. The linearity correction unit 52 outputs a measured angle θc0 obtained by correcting linearity of the measured angle θm.

Figure 6:
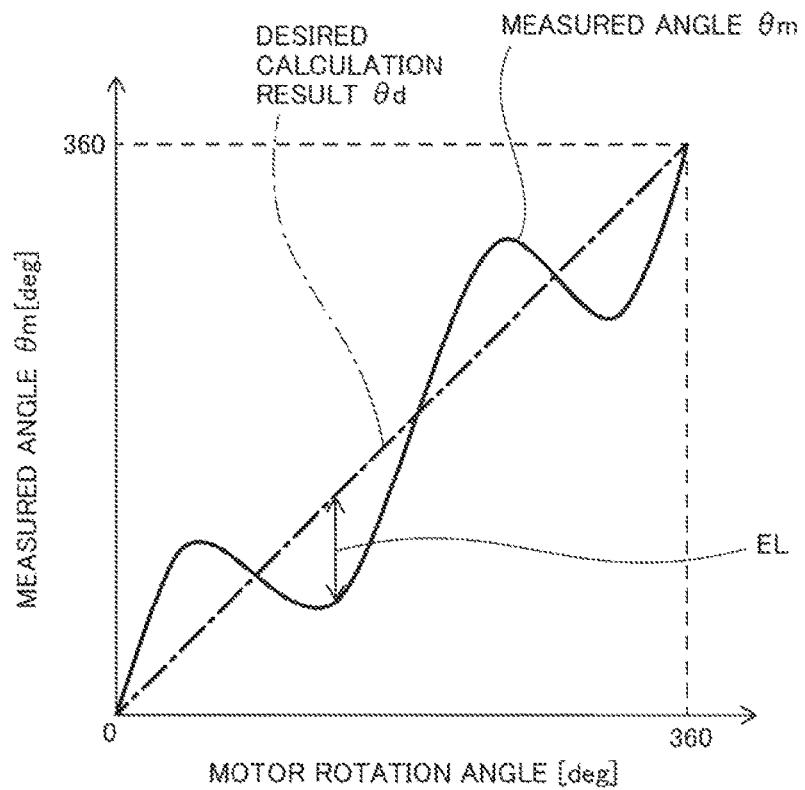
FIG. 6 is an explanatory diagram of linearity error.

With reference to FIG. 6, linearity error of the measured angle θm will be described. The solid line indicates characteristics of the measured angle θm while the rotation shaft 11 of the motor 10 makes one rotation, and the alternate long and short dash line indicates a desired calculation result (detection result) θd of the rotation angle.

Linearity error EL is a difference (θm−θd) between the measured angle θm and the desired calculation result θd, and the linearity correction unit 52 corrects linearity error of the measured angle θm by subtracting the linearity error EL from the measured angle θm, which is input from the rotation angle calculation unit 51.

FIG. 4 is now referred to. The origin correction unit 53 calculates a corrected rotation angle θc by correcting a shift Δθ between the measured angle θc0, which is output by the linearity correction unit 52, and a phase of the rotor (for example, an electrical angle of the rotor) of the motor 10.

Figure 7:
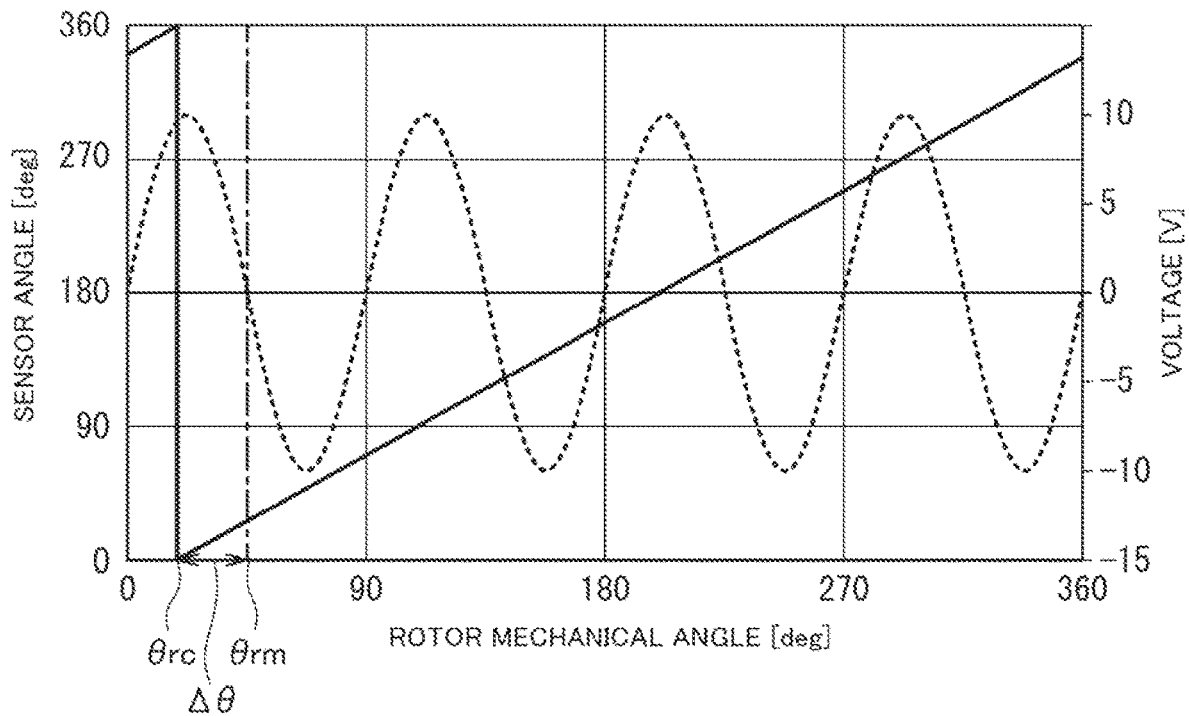
FIG. 7 is an explanatory diagram of a phase shift amount (origin error) between a rotation angle reference of a rotor of a motor and a rotation angle reference of the sensor unit.

With reference to FIG. 7, the shift (hereinafter, sometimes referred to as "phase shift amount") Δθ between the measured angle θm and the phase of the rotor will be described. The solid line indicates the measured angle θm, and the dashed line indicates U-phase induced voltage of the motor 10. FIG. 7 illustrates a U-phase induced voltage waveform of a 4 pole pair motor as an example.

For example, the phase shift amount Δθ is defined as a difference between a mechanical angle θrm of the rotor when the rotation angle of the rotor is at a predetermined rotor-side rotation angle reference and a mechanical angle θrc of the rotor when the measured angle θm is at a predetermined sensor-side rotation angle reference (Δθ=θrc−θrm). The rotor-side rotation angle reference may be a predetermined rotor mechanical angle, a rising point or a falling point of, for example, induced voltage (a zero-cross point of induced voltage), or a predetermined rotor electrical angle (for example, 0 deg). The sensor-side rotation angle reference may, for example, be a predetermined measured angle θm (for example, 0 deg).

FIG. 4 is now referred to. The origin correction unit 53 calculates a corrected rotation angle θc by subtracting the phase shift amount from the measured angle θc0 the linearity of which has been corrected (θc=θc0−Δθ).

Note that, in the present embodiment, the origin correction unit 53 is disposed at the succeeding stage to the linearity correction unit 52 and a shift in the phase from the phase of the rotor is corrected after the linearity of the measured angle θm has been corrected. In place of this configuration, it may be configured such that the linearity correction unit 52 is disposed at the succeeding stage to the origin correction unit 53 and linearity is corrected after a shift in the phase between the measured angle θm and the rotor has been corrected.

The origin correction unit 53 outputs the corrected rotation angle θc to the steering velocity calculation unit 55. The steering velocity calculation unit 55 calculates a steering angle θh of the steering shaft 2 by dividing the corrected rotation angle θc by a gear ratio of the reduction gear 3 and calculates a steering velocity ω by differentiating the steering angle θh. The steering velocity calculation unit 55 outputs the calculated steering velocity ω to the detection signal correction unit 50.

The origin correction unit 53 also outputs the corrected rotation angle θc to the motor control unit 54. To the motor control unit 54, detected values of the motor currents Ium, Ivm, and Iwm, which the current sensor 36 detected, the steering torque Th, which the torque sensor 7 detected, and the vehicle speed Vh, which the vehicle speed sensor 8 detected, are input.

The motor control unit 54 generates a control signal for driving the motor 10 via the drive circuit 35, based on the steering torque Th, the vehicle speed Vh, the corrected rotation angle θc, and the motor currents Ium, Ivm, and Iwm.

Figure 8:
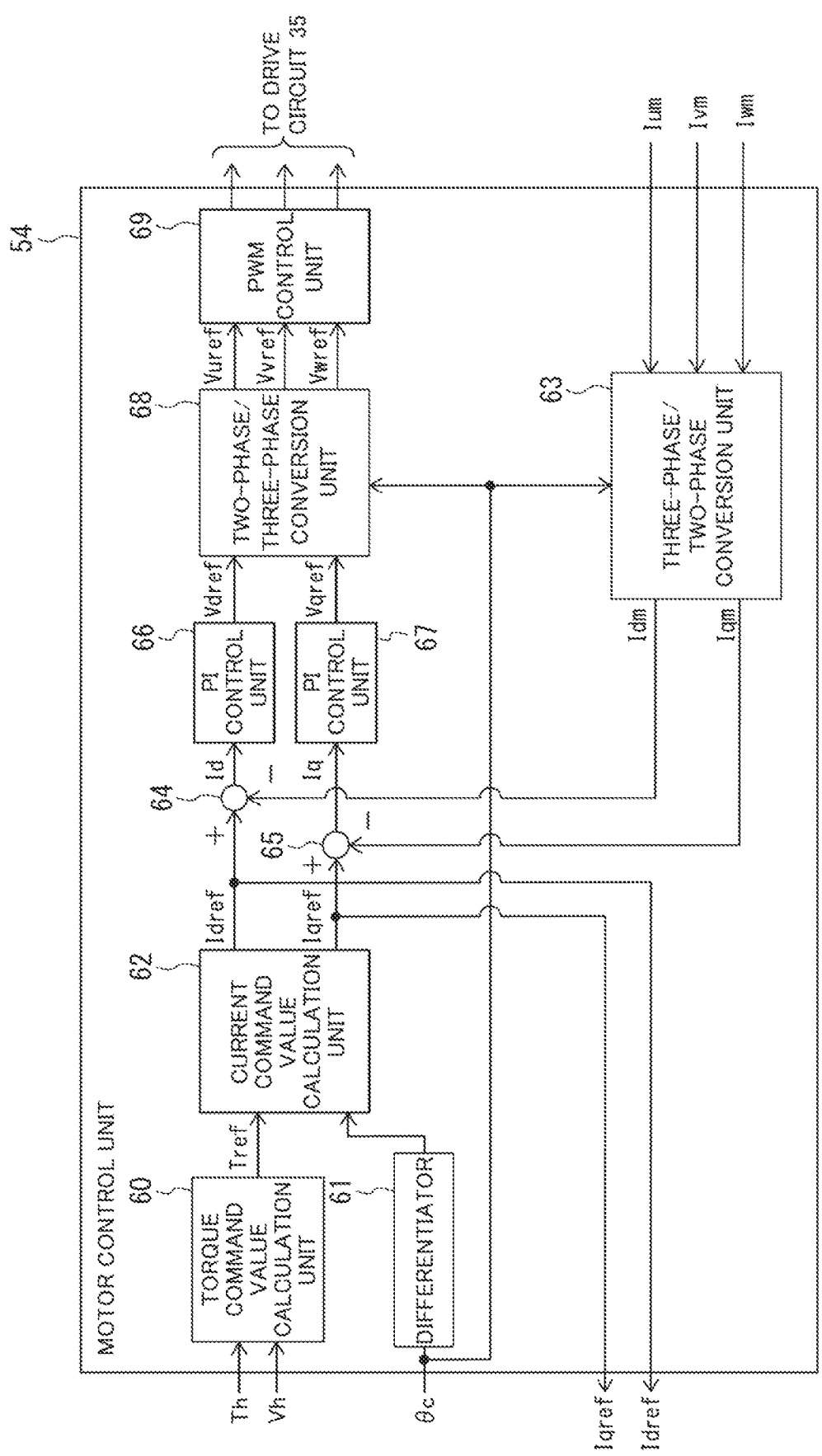
FIG. 8 is a functional configuration diagram of an example of a motor control unit illustrated in FIG. 4.

With reference to FIG. 8, a functional configuration of the motor control unit 54 will be described. The motor control unit 54 includes a torque command value calculation unit 60, a differentiator 61, a current command value calculation unit 62, a three-phase/two-phase conversion unit 63, subtracters 64 and 65, proportional-integral (PI) control units 66 and 67, a two-phase/three-phase conversion unit 68, and a pulse width modulation (PWM) control unit 69.

The torque command value calculation unit 60 calculates a torque command value Tref, using an assist map, based on the steering torque Th and the vehicle speed Vh.

The differentiator 61 differentiates the corrected rotation angle θc and thereby calculates a rotational velocity (rotational angular velocity) ωe of the motor 10.

The current command value calculation unit 62 calculates a d-axis current command value Idref and a q-axis current command value Iqref, using the torque command value Tref and the rotational velocity ωe. The d-axis current command value Idref and the q-axis current command value Iqref are output to the subtracters 64 and 65, respectively. The d-axis current command value Idref and the q-axis current command value Iqref are also output to the detection signal correction unit 50, as illustrated in FIG. 4.

The three-phase/two-phase conversion unit 63 coverts the motor currents Ium, Ivm, and Iwm to two-phase current, using the corrected rotation angle θc. Specifically, the three-phase motor current is converted to d-axis motor current Idm and q-axis motor current Iqm, which are two-phase current.

The subtracter 64 calculates a deviation Id (=Idref−Idm) between the d-axis current command value Idref and the fed-back d-axis motor current value Idm. The subtracter 65 calculates a deviation Iq (=Iqref−Iqm) between the q-axis current command value Iqref and the fed-back q-axis motor current value Iqm.

The PI control unit 66 calculates a d-axis voltage command value Vdref, based on the deviation Id between the d-axis current command value Idref and the d-axis motor current Idm. Similarly, the PI control unit 67 calculates a q-axis voltage command value Vqref, based on the deviation Iq between the q-axis current command value Iqref and the q-axis motor current Iqm.

The two-phase/three-phase conversion unit 68 coverts two-phase voltage composed of the d-axis voltage command value Vdref and the q-axis voltage command value Vqref to three-phase voltage (a U-phase voltage command value Vuref, a V-phase voltage command value Vvref, and a W-phase voltage command value Vwref) by, for example, means of space vector modulation (space vector conversion), using the corrected rotation angle θc.

The PWM control unit 69 generates a control signal controlling the drive circuit 35 by means of PWM control, based on the U-phase voltage command value Vuref, the V-phase voltage command value Vvref, and the W-phase voltage command value Vwref.

With the above-described configuration, the control device 30 drives the motor 10 depending on the rotation angle of the rotation shaft 11 of the motor 10.

Next, details of the detection signal correction unit 50 will be described. The detection signal correction unit 50 has at least two operation modes, namely a "regular mode" and a "correction execution mode".

In the regular mode, the detection signal correction unit 50 corrects offset errors of the sine signal SIN 1 and the cosine signal COS 1 (see FIG. 5A) and amplitude error between the sine signal SIN 1 and the cosine signal COS 1 (see FIG. 5B), based on correction data acquired in a calibration operation upon product shipment.

Hereinafter, a sine signal SIN 1 and a cosine signal COS 1 the offset errors and amplitude error of which have been corrected based on the correction data acquired in the calibration operation upon product shipment are referred to as "calibrated sine signal SIN 2" and "calibrated cosine signal COS 2", respectively.

On the calibrated sine signal SIN 2 and the calibrated cosine signal COS 2, offset errors or amplitude error sometimes occur temporarily due to influence of an actual usage environment (ambient temperature, stress exerted on the MR sensor element 24, electromagnetic interference (EMI), or the like).

When a measured angle θm is calculated based on a signal containing such errors, the linearity of measurement error deteriorates due to influence of the errors. For example, offset errors cause a primary component of error that is a component having a period equal to the rotation period of the motor 10 to occur, and amplitude error causes a secondary component of error that is a component having a period twice the rotation period of the motor 10 to occur.

When the frequency of the primary component and/or secondary component of the linearity error coincides with a resonant frequency of a vehicle body, the vehicle vibrates and the vibration is transmitted to the driver as abnormal noise or vibration, as a result of which there is a possibility that comfortableness is impaired.

Thus, the error calculation unit 56 illustrated in FIG. 4 calculates an offset error Eos of the calibrated sine signal SIN 2, an offset error Eoc of the calibrated cosine signal COS 2, and an amplitude error Ea between the calibrated sine signal SIN 2 and the calibrated cosine signal COS 2.

In the correction execution mode, the detection signal correction unit 50 corrects the offset errors Eos and Eoc and the amplitude error Ea of the calibrated sine signal SIN 2 and the calibrated cosine signal COS 2.

Figure 9:
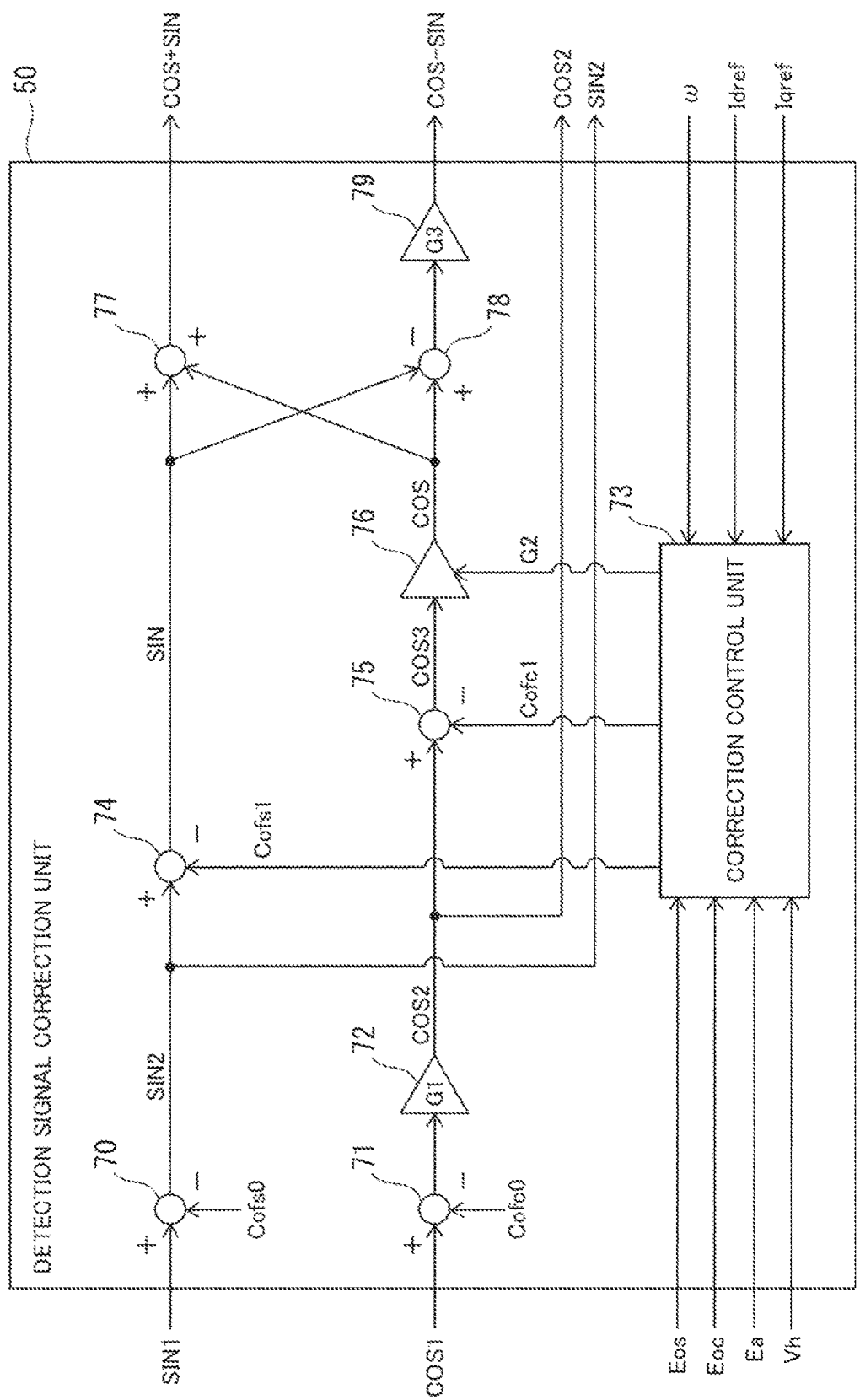
FIG. 9 is a functional configuration diagram of an example of a detection signal correction unit illustrated in FIG. 4.

FIG. 9 is a functional configuration diagram of an example of the detection signal correction unit 50. The detection signal correction unit 50 includes a first sine offset correction unit 70, a first cosine offset correction unit 71, a first amplitude error correction unit 72, a correction control unit 73, a second sine offset correction unit 74, a second cosine offset correction unit 75, a second amplitude error correction unit 76, an adder 77, a subtracter 78, and a phase error correction unit 79.

The first sine offset correction unit 70 corrects offset error of the sine signal SIN 1, based on a first sine offset correction value Cofs0 that is correction data acquired in the calibration operation upon product shipment. Specifically, the first sine offset correction unit 70 calculates a calibrated sine signal SIN 2 by subtracting the first sine offset correction value Cofs0 from the sine signal SIN 1.

The first cosine offset correction unit 71 corrects offset error of the cosine signal COS 1, based on a first cosine offset correction value Cofc0 that is correction data acquired in the calibration operation upon product shipment.

In addition, the first amplitude error correction unit 72 corrects amplitude error between the sine signal SIN 1 and the cosine signal COS 1, based on a first amplitude correction gain G1 that is correction data acquired in the calibration operation upon product shipment.

Specifically, the first cosine offset correction unit 71 subtracts the first cosine offset correction value Cofc0 from the cosine signal COS 1, and the first amplitude error correction unit 72 calculates a calibrated cosine signal COS 2 by multiplying a result of the subtraction by the first amplitude correction gain G1.

The correction control unit 73 switches the operation mode of the detection signal correction unit 50 between the regular mode and the correction execution mode.

Specifically, when a predetermined correction execution condition holds while the detection signal correction unit 50 is operating in the regular mode, the correction control unit 73 switches the operation mode of the detection signal correction unit 50 from the regular mode to the correction execution mode. In addition, when a predetermined correction disabling condition holds while the detection signal correction unit 50 is operating in the correction execution mode, the correction control unit 73 switches the operation mode of the detection signal correction unit 50 from the correction execution mode to the regular mode.

An example of a state transition diagram of the operation modes of the detection signal correction unit 50 is illustrated in FIG. 10.

For example, the correction execution condition may require that at least both the following conditions (A1) and (A2) are satisfied.

(A1) The steering velocity $\omega$ is equal to or greater than a first steering velocity threshold value $Th\omega 1$.

(A2) The absolute value |Eos| of the offset error Eos of the calibrated sine signal SIN 2 or the absolute value |Eoc| of the offset error Eoc of the calibrated cosine signal COS 2 is equal to or greater than an error threshold value Teo.

The first steering velocity threshold value $Th\omega 1$ may be appropriately set depending on, for example, the resonant frequency of the vehicle and the gear ratio of the reduction gear 3. The resonant frequency and the gear ratio vary depending on the type of a vehicle.

For example, as shown in the following table 1, a range of the resonant frequency and a range of the gear ratio of the reduction gear 3 are generally set as a range of 20 Hz to 40 Hz and a range of 18.5 to 20.5, respectively.

TABLE 1

| Parameter | Parameter range | Minimum steering velocity causing vibration at resonant frequency to occur | Maximum steering velocity causing vibration at resonant frequency to occur |
|---|---|---|---|
| Resonant frequency of vehicle body | 20 Hz to 40 Hz | 20 Hz | 40 Hz |
| Gear ratio of reduction gear | 18.5 to 20.5 | 20.5 | 18.5 |
| Linearity error of measured angle $\theta m$ | primary component or secondary component | secondary component | primary component |
| Steering velocity causing vibration at resonant frequency to occur | | 175 deg/sec | 778 deg/sec |

In this case, a condition for minimizing the steering velocity $\omega$ at which the motor 10 causes vibration at the resonant frequency of the vehicle to occur is a case where the resonant frequency is 20 Hz, the gear ratio is 20.5, and the resonance occurs due to the secondary component of the linearity error of the measured angle $\theta m$. The steering velocity $\omega$ in this case is 175 deg/sec.

On the other hand, a condition for maximizing the steering velocity $\omega$ at which the motor 10 causes vibration at the resonant frequency of the vehicle to occur is a case where the resonant frequency is 40 Hz, the gear ratio is 18.5, and the resonance occurs due to the primary component of the linearity error of the measured angle $\theta m$. The steering velocity $\omega$ in this case is 778 deg/sec.

Therefore, the first steering velocity threshold value $Th\omega 1$ may, for example, be appropriately set to be a value within a range of 175 deg/sec to 778 deg/sec. For example, a case where the gear ratio is 20.5, the resonant frequency is 25 Hz, and the primary component of error mainly occurs is considered. A steering velocity equivalent to the resonant frequency of 25 Hz is 360 deg×25 Hz/20.5=439 deg/sec. The first steering velocity threshold value Thω1 may be set at 400 deg/sec, which is lower than 439 deg/sec.

In addition, the error threshold value Teo may be appropriately set depending on a system. For example, when a normal sine signal SIN 1 and cosine signal COS 1 are signals that oscillate around 2.5 V with an amplitude of 1.5 V (that is, SIN 1=1.5×sin θ+2.5 [V] and COS 1=1.5×cos θ+2.5 [V]), the error threshold value Teo may be set at 10 mV.

As described above, transition to the correction execution mode when the absolute values |Eos| and |Eoc of the offset errors are equal to or greater than the error threshold value Teo causes the correction to be suppressed when the error is within a normal variation range. This configuration enables comfortableness to be prevented from being impaired due to frequent correction.

The correction execution condition may require that, in addition to the conditions (A1) and (A2), either or both of the following conditions (A3) and (A4) are satisfied.

(A3) A current command value Iref=(Idref$^2$+Iqref$^2$)$^{1/2}$ is equal to or greater than a current threshold value Ti.

(A4) The vehicle speed Vh is equal to or less than a vehicle speed threshold value Tv.

Regarding the condition (A3), the current command value Iref is equivalent to steering assist torque that the motor 10 generates. Therefore, transition to the correction execution mode when the current command value Iref is equal to or greater than the current threshold value Ti enables vibration occurring due to errors of the sine signal SIN 1 and the cosine signal COS 1 to be suppressed while output torque from the motor 10 is large and large vibration is thus likely to occur.

The current threshold value Ti may be appropriately set depending on a system and may, for example, be 20 A. The condition (A3) may require that the torque command value Tref, in place of the current command value Iref, is equal to or greater than a threshold value.

Regarding the condition (A4), transition to the correction execution mode when the vehicle speed Vh is equal to or less than the vehicle speed threshold value Tv enables vibration occurring due to errors of the sine signal SIN 1 and the cosine signal COS 1 to be suppressed during low speed travel, in which large steering assist force is required and vibration occurring from the motor 10 is likely to become large. The vehicle speed threshold value Tv may be appropriately set depending on a system and may, for example, be 15 km/h.

The above-described condition (A2) may be replaced with the following condition (A5).

(A5) The amplitude error Ea between the calibrated sine signal SIN 2 and the calibrated cosine signal COS 2 is equal to or greater than an error threshold value Tea.

The error threshold value Tea may also be appropriately set depending on a system. For example, the error threshold value Tea may be set at a value approximately 0.6% of the amplitudes of the normal sine signal SIN 1 and cosine signal COS 1.

The above-described condition (A2) may also be replaced with the following condition (A6).

(A6) The absolute value |Eos| or |Eoc| of the offset error is equal to or greater than the error threshold value Teo and the amplitude error Ea is equal to or greater than the error threshold value Tea.

On the other hand, the correction disabling condition may, for example, require that the following condition (B1) is satisfied.

(B1) The steering velocity ω is less than a second steering velocity threshold value Thω2.

The second steering velocity threshold value Thω2 may be the same value as the first steering velocity threshold value Thω1, or the second steering velocity threshold value Thω2 may be set at a value less than the first steering velocity threshold value Thω1 and the operation mode may thereby be configured to have hysteresis characteristics. For example, when the first steering velocity threshold value Thω1 is 400 deg/sec, the second steering velocity threshold value Thω2 may be set at 300 deg/sec.

FIG. 9 is now referred to. In the correction execution mode, the correction control unit 73 outputs the offset error Eos, the offset error Eoc, and the amplitude error Ea as a second sine offset correction value Cofs1, a second cosine offset correction value Cofc1, and a second amplitude correction gain G2, respectively.

Note that the correction control unit 73 may limit the magnitudes of the second sine offset correction value Cofs1, the second cosine offset correction value Cofc1, and the second amplitude correction gain G2 to values equal to or less than respective upper limit values therefor. This configuration enables error due to a malfunction of the sensor to be prevented from being unintentionally corrected.

The second sine offset correction unit 74 corrects the calibrated sine signal SIN 2, based on the second sine offset correction value Cofs1. Specifically, the second sine offset correction unit 74 calculates a sine signal SIN by subtracting the second sine offset correction value Cofs1 from the calibrated sine signal SIN 2.

The second cosine offset correction unit 75 corrects the calibrated cosine signal COS 2, based on the second cosine offset correction value Cofc1. Specifically, the second cosine offset correction unit 75 calculates a cosine signal COS 3 by subtracting the second cosine offset correction value Cofc1 from the calibrated cosine signal COS 2.

The second amplitude error correction unit 76 corrects amplitude error between the calibrated sine signal SIN 2 and the calibrated cosine signal COS 2, based on the second amplitude correction gain G2.

Specifically, the second amplitude error correction unit 76 calculates a cosine signal COS by multiplying the cosine signal COS3, which is output from the second cosine offset correction unit 75, by the second amplitude correction gain G2.

With the above-described configuration, in the correction execution mode, the detection signal correction unit 50 corrects the offset errors Eos and Eoc and the amplitude error Ea of the calibrated sine signal SIN 2 and the calibrated cosine signal COS 2.

On the other hand, in the regular mode, the correction control unit 73 sets the values of the second sine offset correction value Cofs1 and the second cosine offset correction value Cofc1 to "0" and sets the value of the second amplitude correction gain G2 to "1". Thus, the calibrated sine signal SIN 2 and the calibrated cosine signal COS 2 are output without being corrected as a sine signal SIN and a cosine signal COS from the second sine offset correction unit 74 and the second amplitude error correction unit 76, respectively. In other words, the offset errors Eos and Eoc and the amplitude error Ea are not corrected.

The adder 77 calculates a sum signal (COS+SIN) of the sine signal SIN and the cosine signal COS and outputs the sum signal (COS+SIN) to the rotation angle calculation unit 51 (see FIG. 4).

The subtracter 78 calculates a difference signal (COS−SIN) between the sine signal SIN and the cosine signal COS and outputs the difference signal (COS−SIN) to the phase error correction unit 79.

The phase error correction unit 79 removes influence of phase error between the sine signal SIN 1 and the cosine signal COS 1 from the sum signal (COS+SIN) and the difference signal (COS−SIN) by multiplying the difference signal (COS−SIN) by a phase correction gain G3. The phase error correction unit 79 outputs the difference signal (COS−SIN) to the rotation angle calculation unit 51.

(Operation)

Next, with reference to FIG. 11, an example of a detection signal correction method of the embodiment will be described.

In step S1, the rotation angle calculation unit 51 calculates a measured angle θm that is a measured value of the rotation angle of the rotation shaft of the motor 10. The linearity correction unit 52 and the origin correction unit 53 calculates a corrected rotation angle θc by correcting linearity error and a phase shift amount of the measured angle θm, respectively.

In step S2, the steering velocity calculation unit 55 calculates a steering angle θh of the steering shaft 2 by dividing the corrected rotation angle θc by a gear ratio of the reduction gear 3 and calculates a steering velocity ω by differentiating the steering angle θh.

In step S3, the vehicle speed sensor 8 detects vehicle speed Vh of the vehicle.

In step S4, the torque command value calculation unit 60 calculates a torque command value Tref, and the current command value calculation unit 62 calculates a d-axis current command value Idref and a q-axis current command value Iqref depending on the torque command value Tref.

In step S5, the error calculation unit 56 calculates an offset error Eos of a calibrated sine signal SIN 2, an offset error Eoc of a calibrated cosine signal COS 2, and an amplitude error Ea between the calibrated sine signal SIN 2 and the calibrated cosine signal COS 2. The correction control unit 73 in the detection signal correction unit 50 learns the offset errors Eos and Eoc and the amplitude error Ea as a second sine offset correction value Cofs1, a second cosine offset correction value Cofc1, and a second amplitude correction gain G2, respectively.

In step S6, the correction control unit 73 determines whether or not the operation mode of the detection signal correction unit 50 is the regular mode. When the operation mode is the regular mode (step S6: Y), the process proceeds to step S7. When the operation mode is not the regular mode but the correction execution mode (step S6: N), the process proceeds to step S11.

In step S7, the correction control unit 73 determines whether or not the correction execution condition holds. When the correction execution condition holds (step S7: Y), the process proceeds to step S8. When the correction execution condition does not hold (step S7: N), the process proceeds to step S10.

In step S8, the correction control unit 73 causes the operation mode of the detection signal correction unit 50 to transition to the correction execution mode.

In step S9, the second sine offset correction unit 74, the second cosine offset correction unit 75, and the second amplitude error correction unit 76 correct the offset errors Eos and Eoc and the amplitude error Ea of the calibrated sine signal SIN 2 and the calibrated cosine signal COS 2, using the learned second sine offset correction value Cofs1, second cosine offset correction value Cofc1, and second amplitude correction gain G2. Subsequently, the process proceeds to step S15.

On the other hand, in step S10, the correction control unit 73 discards the learned second sine offset correction value Cofs1, second cosine offset correction value Cofc1, and second amplitude correction gain G2. Specifically, the correction control unit 73 prevents the correction from being executed by setting the values of the second sine offset correction value Cofs1 and the second cosine offset correction value Cofc1 to "0" and setting the value of the second amplitude correction gain G2 to "1". Subsequently, the process proceeds to step S15.

When the operation mode of the detection signal correction unit 50 is the correction execution mode (step S6: N), the correction control unit 73 determines whether or not the correction disabling condition holds in step S11. When the correction disabling condition holds (step S11: Y), the process proceeds to step S12. When the correction disabling condition does not hold (step S11: N), the process proceeds to step S14.

In step S12, the correction control unit 73 discards the learned second sine offset correction value Cofs1, second cosine offset correction value Cofc1, and second amplitude correction gain G2. Specifically, the correction control unit 73 prevents the correction from being executed by setting the values of the second sine offset correction value Cofs1 and the second cosine offset correction value Cofc1 to "0" and setting the value of the second amplitude correction gain G2 to "1".

In step S13, the correction control unit 73 causes the operation mode of the detection signal correction unit 50 to transition to the regular mode. Subsequently, the process proceeds to step S15.

On the other hand, in step S14, the second sine offset correction unit 74, the second cosine offset correction unit 75, and the second amplitude error correction unit 76 correct the offset errors Eos and Eoc and the amplitude error Ea of the calibrated sine signal SIN 2 and the calibrated cosine signal COS 2, using the learned second sine offset correction value Cofs1, second cosine offset correction value Cofc1, and second amplitude correction gain G2. Subsequently, the process proceeds to step S15.

In step S15, the control device 30 determines whether or not an ignition key signal is turned off. When the ignition key signal has not been turned off (step S15: N), the process returns to step S1. When the ignition key signal is turned off (step S15: Y), the process terminates.

Advantageous Effects of Embodiment (1) The sensor unit 20 outputs a sine signal and a cosine signal depending on the rotation of the rotation shaft 11 of the motor 10 that provides the steering shaft 2 of the vehicle with steering assist torque. The rotation angle calculation unit 51 calculates a rotation angle of the rotation shaft 11, based on the sine signal and the cosine signal. The steering velocity calculation unit 55 calculates a steering velocity of the steering shaft 2, based on the rotation angle. The error calculation unit 56 calculates errors of the sine signal and the cosine signal. The detection signal correction unit 50 corrects the errors of the sine signal and the cosine signal when the steering velocity is equal to or greater than a steering velocity threshold value and the errors of the sine signal and the cosine signal are equal to or greater than error threshold values.

This configuration enables vibration of the motor 10 due to errors of the sine signal and the cosine signal to be suppressed at a steering velocity at which vibration at a resonant frequency of the vehicle is likely to occur. As a result, it is possible to reduce a problem that the vehicle resonates due to vibration that the motor 10 generates and the resonance is transmitted to the driver as abnormal noise or vibration and impairs comfortableness.

(2) The detection signal correction unit 50 may correct errors of the sine signal and the cosine signal when, further, steering assist torque that is provided to the steering shaft 2 is equal to or greater than a threshold value. This configuration enables vibration due to errors of the sine signal and the cosine signal to be suppressed while output torque from the motor 10 is large and large vibration is thus likely to occur.

(3) The detection signal correction unit 50 may correct errors of the sine signal and the cosine signal when, further, vehicle speed of the vehicle is equal to or less than a vehicle speed threshold value. This configuration enables vibration due to errors of the sine signal and the cosine signal to be suppressed during low speed travel, in which large steering assist force is required and vibration occurring from the motor 10 is likely to become large.

(4) The above-described errors of the sine signal and the cosine signal may be offset errors of the sine signal and the cosine signal or amplitude error between the sine signal and the cosine signal. This configuration enables offset errors and amplitude error that influence the primary component and the secondary component of linearity error of the rotation angle, which is calculated based on the sine signal and the cosine signal, respectively, to be corrected.

REFERENCE SIGNS LIST

1 Steering wheel
2 Steering shaft
3 Reduction gear
4A, 4B Universal joint
5 Pinion rack mechanism
6 Tie rod
7 Torque sensor
8 Vehicle speed sensor
10 Motor
11 Rotation shaft
20 Sensor unit
21 Magnet
22 Circuit board
23 Support member
24 MR sensor element
25 Harness
30 Control device
31 Processor
32 Storage device
33, 34 Analog-digital converter
35 Drive circuit
36 Current sensor
37 I/F circuit
40 Battery
41 Ignition Key
50 Detection signal correction unit
51 Rotation angle calculation unit
52 Linearity correction unit
53 Origin correction unit
54 Motor control unit
55 Steering velocity calculation unit
56 Error calculation unit
60 Torque command value calculation unit
61 Differentiator
62 Current command value calculation unit
63 Three-phase/two-phase conversion unit
64, 65, 78 Subtracter
66, 67 PI control unit
68 Two-phase/three-phase conversion unit
69 PWM control unit
70 First sine offset correction unit
71 First cosine offset correction unit
72 First amplitude error correction unit
73 Correction control unit
74 Second sine offset correction unit
75 Second cosine offset correction unit
76 Second amplitude error correction unit
77 Adder
79 Phase error correction unit

The invention claimed is:

1. A method for controlling a motor control device for a motor providing a steering shaft of a vehicle with steering assist torque comprising:
obtaining a sine signal and a cosine signal, the sine signal and the cosine signal being detection signals output from a sensor depending on rotation of a rotation shaft of the motor providing the steering shaft of the vehicle with the steering assist torque;
calculating a rotation angle of the rotation shaft, based on the detection signals;
calculating a steering velocity of the steering shaft, based on the rotation angle;
calculating an error of the detection signals;
correcting the error of the detection signals when the steering velocity is equal to or greater than a steering velocity threshold value and the error of the detection signals is equal to or greater than an error threshold value; and
providing the corrected detection signals to the motor such that the motor provides the steering shaft of the vehicle with a corrected steering assist torque.

2. The method for controlling a motor control device for a motor providing a steering shaft of a vehicle with steering assist torque according to claim 1, wherein
the method further includes correcting the error of the detection signals when, the steering assist torque provided to the steering shaft is equal to or greater than a threshold value.

3. The method for controlling a motor control device for a motor providing a steering shaft of a vehicle with steering assist torque according to claim 1, wherein
the method further includes correcting the error of the detection signals when, a vehicle speed of the vehicle is equal to or less than a vehicle speed threshold value.

4. The method for controlling a motor control device for a motor providing a steering shaft of a vehicle with steering assist torque according to claim 1, wherein
the error of the detection signals is an offset of the sine signal or the cosine signal or amplitude error between the sine signal and the cosine signal.

5. A motor control device for a motor providing a steering shaft of a vehicle with steering assist torque, comprising:
a sensor configured to output detection signals including a sine signal and a cosine signal depending on rotation of a rotation shaft of the motor; and
an electronic controller including a processor, the electronic controller configured to:
calculate a rotation angle of the rotation shaft, based on the detection signals;

control the motor, based on the rotation angle;
calculate a steering velocity of the steering shaft, based on the rotation angle;
calculate an error of the detection signals; and
correct the error of the detection signals when the steering velocity is equal to or greater than a steering velocity threshold value and the error of the detection signals is equal to or greater than an error threshold value.

6. The motor control device according to claim 5, wherein the electronic controller is further configured to correct the error of the detection signals when, further, steering assist torque provided to the steering shaft is equal to or greater than a threshold value.

7. The motor control device according to claim 5, wherein the electronic controller is further configured to correct the error of the detection signals when, further, vehicle speed of the vehicle is equal to or less than a vehicle speed threshold value.

8. The motor control device according to claim 5, wherein the error of the detection signals is an offset of the sine signal or the cosine signal or amplitude error between the sine signal and the cosine signal.

9. An electric power steering device comprising:
the motor control device according to claim 5; and
a motor controlled by the electronic controller, wherein
the electric power steering device provides a steering shaft of a vehicle with steering assist force, using the motor.

* * * * *